United States Patent

Bill

(10) Patent No.: US 12,058,751 B2
(45) Date of Patent: Aug. 6, 2024

(54) CONFIGURATION MODE ENTRY FOR A TIRE MONITORING DEVICE

(71) Applicant: AIRBUS OPERATIONS LIMITED, Bristol (GB)

(72) Inventor: Andrew Bill, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 328 days.

(21) Appl. No.: 17/419,575

(22) PCT Filed: Jun. 16, 2020

(86) PCT No.: PCT/EP2020/066547
§ 371 (c)(1),
(2) Date: Jun. 29, 2021

(87) PCT Pub. No.: WO2020/254278
PCT Pub. Date: Dec. 24, 2020

(65) Prior Publication Data
US 2022/0086934 A1 Mar. 17, 2022

(30) Foreign Application Priority Data
Jun. 17, 2019 (GB) ..................................... 1908644

(51) Int. Cl.
*G08B 3/00* (2006.01)
*B60C 23/04* (2006.01)
(Continued)

(52) U.S. Cl.
CPC ......... *H04W 76/15* (2018.02); *B60C 23/0454* (2013.01); *B60C 23/0461* (2013.01);
(Continued)

(58) Field of Classification Search
USPC ...... 701/36, 45, 41, 51, 70, 1, 2, 29.4, 29.6, 701/31.4, 34.4, 99, 102, 33.7, 33.9, 400,
(Continued)

(56) References Cited

U.S. PATENT DOCUMENTS

2002/0030592 A1* 3/2002 Hakanen ............. B60C 23/0408
340/447
2002/0177406 A1* 11/2002 O'Connor ........... B60C 23/0433
455/39

(Continued)

FOREIGN PATENT DOCUMENTS

CN 1784318 A 6/2006
CN 201961113 U 9/2011
(Continued)

OTHER PUBLICATIONS

Chinese Office Action cited in Application No. 202080006995.6, mailed May 17, 2023, 7 pages.
(Continued)

*Primary Examiner* — Daniel Previl
(74) *Attorney, Agent, or Firm* — Nixon & Vanderhye P.C.

(57) ABSTRACT

Restricting commands for a tire monitoring device including controlling entry into a configuration mode and restricting operation based on detection of an abnormal command pattern. The method includes, at a tire monitoring device: receiving a configuration request from a first device for the tire monitoring device to operate in a configuration mode, the configuration request provided using a first wireless communication protocol; responsive to receipt of the configuration request, initiating communication using a second wireless communication protocol; establishing successful communication using the second wireless protocol; and entering the configuration mode responsive to establishing successful communication using the second wireless communication protocol. In another example, a method restricts (Continued)

operation of a tire monitoring device including receiving instructions via a wireless communication interface; detecting an abnormal instruction pattern based on the received instructions; and restricting the operation of the tire monitoring device responsive to detecting the abnormal instruction pattern.

14 Claims, 8 Drawing Sheets

(51) Int. Cl.
  *H04W 76/15* (2018.01)
  *H04W 4/80* (2018.01)
(52) U.S. Cl.
  CPC ...... *B60C 23/0471* (2013.01); *B60C 23/0479* (2013.01); *B60C 2200/02* (2013.01); *H04W 4/80* (2018.02)
(58) Field of Classification Search
  USPC .... 701/300, FOR. 107, FOR. 000, 468, 491; 717/174, 168, 100, FOR. 000; 726/28, 1, 726/29, 3, 4, 2, 22, 26, 34; 180/232, 271, 180/164, 116, 165, 166, 2.1, 167, 170, 180/180, 182, 197, 198, 199, 204, 6.2, 180/7.1, 11, 14.1, 15, 16, 19.1, 20, 21, 180/36, 41, 233, 252, 268, 53.1, 54.1, 180/337, 76, 314, 315, 400, 84, 89.1, 180/311, 313, 900, 901, 902, 903, 904, 180/905, 906, 907, 908, FOR. 000; 340/4.3, 438, 439, 905, 850, 853.1, 340/870.01, 901, 906, 907, 932.2, 933, 340/944, 945, 984, 988, 425.5, 146.2, 340/500, 1.1, 286.01, 425.1, 407.1, 815.4, 340/999, FOR. 000, FOR. 311, FOR. 415, 340/FOR. 465, 442, 447, 426.2, 426.21, 340/444, 449, 457, 464–465, 477, 488, 340/514, 539.1, 539.21–539.22, 588–589, 340/660; 370/329, 200, 201, 202, 203, 370/212, 213, 214, 215, 216, 229, 241, 370/297, 298, 307, 308, 309, 310, 351, 370/431, 464, 546, 901, 908, 912, 914, 370/915, 916, FOR. 000, FOR. 100, 370/FOR. 101, FOR. 122, FOR. 135, 370/FOR. 195, FOR. 196, 338, 401, 254, 370/392, 328, 252, 466, 315, 346, 352, 370/449, 465, 259, 272, 273, 276; 455/418, 1, 2.01, 422.1, 426.1, 435.1, 455/41.2, 420, 432.1, 434, 569.2, 66.1, 455/3.01, 400, 403, 7, 26.1, 39, 73, 91, 455/130, 899, FOR. 000, FOR. 106, 455/FOR. 121, FOR. 200, FOR. 203, 455/FOR. 204, FOR. 205, FOR. 213, 455/FOR. 214; 709/204, 213, 219, 223, 709/225, 201, 208, 212, 217, 220, 227, 709/230, 238, 245, 246, 248, 249, 250, 709/251, 252, 253, 228; 348/14.02, 348/14.01, 21, 22, 24, 31, 25, 32, 35, 36, 348/40, 42, 61; 600/538, 300, 1, 9, 16, 600/21, 23, 25, 26, 29, 38, 33, 36, 37, 600/101, 184, 247, 249, 920, 921, 600/FOR. 000; 713/155, 168, 1, 100, 713/150, 187, 188, 189, 300
  See application file for complete search history.

(56) References Cited

U.S. PATENT DOCUMENTS

| | | | |
|---|---|---|---|
| 2005/0110623 | A1 | 5/2005 | Schulze et al. |
| 2006/0192438 | A1 | 8/2006 | Hattori |
| 2006/0220805 | A1 | 10/2006 | Thomas et al. |
| 2006/0290485 | A1* | 12/2006 | Watabe ............... B60C 23/0413 340/447 |
| 2007/0068240 | A1 | 3/2007 | Watabe |
| 2008/0018448 | A1 | 7/2008 | Ghabra et al. |
| 2012/0007730 | A1* | 1/2012 | Vecht-Lifshitz ........ B60S 5/046 340/442 |
| 2012/0166836 | A1 | 6/2012 | Hardman et al. |
| 2014/0111326 | A1* | 4/2014 | Borisenko ............. G01M 17/02 340/447 |
| 2017/0036499 | A1 | 2/2017 | McIntyre et al. |
| 2017/0190225 | A1 | 7/2017 | Yu et al. |
| 2017/0316623 | A1* | 11/2017 | Godet ................... B60C 23/06 |
| 2019/0184772 | A1 | 6/2019 | Bill et al. |
| 2019/0225034 | A1 | 7/2019 | Van Wiemeersch et al. |
| 2022/0055423 | A1 | 2/2022 | Bill |
| 2022/0185041 | A1 | 6/2022 | Bill et al. |

FOREIGN PATENT DOCUMENTS

| | | |
|---|---|---|
| CN | 103587357 | 2/2014 |
| CN | 104070943 A | 10/2014 |
| CN | 204161008 U | 2/2015 |
| CN | 106274307 A | 1/2017 |
| CN | 106994869 A | 8/2017 |
| CN | 107009828 | 8/2017 |
| CN | 107015838 | 8/2017 |
| CN | 107187280 A | 9/2017 |
| CN | 206664171 U | 11/2017 |
| CN | 108128104 | 6/2018 |
| CN | 108566407 | 9/2018 |
| EP | 2 910 393 | 8/2015 |
| EP | 3 517 325 | 7/2019 |
| JP | 2016-78488 | 5/2016 |
| JP | WO2019/106828 | 8/2020 |
| WO | 94/18017 A1 | 8/1994 |
| WO | 03016079 | 2/2003 |
| WO | 2011/061574 A1 | 5/2011 |
| WO | 2020/254278 A1 | 12/2020 |
| WO | 2020/254282 A1 | 12/2020 |

OTHER PUBLICATIONS

Official Action cited in U.S. Appl. No. 17/418,166 mailed Aug. 11, 2023, 8 pages.
Chinese Office Action cited in Application No. 202080006998.X mailed Dec. 15, 2023, 12 pages.
Combined Search and Examination Report for GB Application No. 1908644.6 dated Oct. 23, 2019, 9 pages.
International Search Report and Written Opinion of the ISA for PCT/EP2020/066547 dated Sep. 28, 2020, 10 pages.
CN Office Action cited in Application No. 202080006995.6 mailed Feb. 7, 2024, 10 pages.
Chinese Office Action cited in Application No. 202080006998.X mailed May 10, 2024, 9 pages.

* cited by examiner

CONFIGURATION MODE ENTRY FOR A TIRE MONITORING DEVICE

RELATED APPLICATIONS

This application is the U.S. national phase of International Application PCT/EP2020/066547 filed Jun. 16, 2020, which designated the U.S. and claims priority to United Kingdom patent application GB 1908644.6 filed Jun. 17, 2019, the entire contents of each of which are hereby incorporated by reference.

TECHNICAL FIELD

The present disclosure relates to a tyre monitoring system and methods of its operation. In examples, the present disclosure relates to an aircraft tyre monitoring system, such as an aircraft tyre pressure monitoring system.

BACKGROUND

Checking tyre pressure is an important part of the maintenance of a vehicle. Tyre pressures should be maintained at predetermined pressures to ensure that a tyre performs as intended by the manufacturer. Incorrect tyre pressure can lead to a tyre failing, perhaps bursting and causing damage to the vehicle and/or a loss of control. Due to the high speeds encountered by the tyres on aircraft landing gear, pressures are checked regularly, perhaps once a day or more frequently. Manual checking of tyre pressure takes time, reducing this time is beneficial.

It has been proposed to automate tyre pressure measurement by included a sensing device in a wheel which can then be interrogated wirelessly to provide a measurement of tyre pressure. This can reduce the time required compared to a manual reading, but can still take time due to a requirement to travel from wheel to wheel measuring the pressures.

It would be desirable to provide a tyre pressure measurement system which addresses some, or all, of these points.

SUMMARY

According to a first aspect, there is provided a method comprising, at a tyre monitoring device: receiving a configuration request from a first device, the configuration request indicating that the tyre pressure monitoring device is to operate in a configuration mode, the configuration request provided using a first wireless communication protocol; responsive to receipt of the configuration request, initiating communication using a second wireless communication protocol; establishing successful communication using the second wireless protocol; and entering the configuration mode responsive to establishing successful communication using the second wireless communication protocol.

Optionally, in the configuration mode, the tyre monitoring device receives at least one of configuration data and configuration instructions from the first device using the first wireless communication protocol.

Optionally, the configuration instructions comprise at least one of: a data download instruction; a tyre monitoring device test instruction; a system test instruction; a fault reset instruction; and a delete instruction.

Optionally, communication with the first device using the first wireless communication protocol is controlled by the tyre monitoring device.

Optionally, the communication using a second wireless protocol is with a second device, different from the first device.

Optionally, the tyre pressure monitoring device remains in the configuration mode for a predetermined time period after entering the configuration mode.

Optionally, the first wireless communication protocol has a larger range than the second wireless communication protocol.

Optionally, the first wireless communication protocol has a range of more than 20 m and the second wireless communication protocol has a range of less than 10 cm.

Optionally, the method further comprises rejecting a configuration request when received via the second wireless communication protocol.

Optionally, the method further comprises determining that the first device is trusted and the entering the configuration mode is responsive both the determination that the first device is trusted and establishing successful communication using the second wireless communication protocol.

According to a second aspect, there is provided a tyre monitoring device comprising: a wireless communication interface; and a processing system. The processing system is configured to cause the tyre monitoring device to execute the method of any preceding claims.

Optionally, the wireless communication interface comprises: a first transceiver for communication using the first wireless communication protocol; and a second transceiver for communication using the second wireless communication protocol.

According to a third aspect, there is provided a tyre monitoring device configured to be mounted on a wheel of a vehicle. The tyre monitoring device comprises a first wireless communication interface; a second wireless communication interface; and a processing system. The processing system is configured to enter the tyre monitoring device into a configuration mode by: receiving a configuration request using the first wireless communication interface; responsive to receipt of the configuration request, initiating communication using the second wireless communication interface; establishing successful communication using the second wireless communication interface; and entering a configuration mode responsive to the establishing successful communication using the second wireless communication interface According to a fourth aspect there is provided a tyre monitoring system comprising a tyre monitoring device as defined above for the second and third aspects; and a first device arranged to send at least a configuration request to the tyre pressure monitoring device.

According to a fifth aspect, there is provided computer-readable medium comprising computer-readable instructions that when executed by a processor, cause a tyre pressure monitoring device to execute the method of the above described first aspect.

Further features and advantages of the invention will become apparent from the following description of preferred examples of the invention, given by way of example only, which is made with reference to the accompanying drawings.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Certain methods and systems described herein relate to the operation of a sensor network in an aircraft. In examples described herein, references to "aircraft" include all kinds of aircraft, such as fixed wing, for example military or commercial aircraft, or unmanned aerial vehicles (UAVs), and rotary wing aircraft, for example helicopters.

According to examples herein, a tyre monitoring device only enters into a configuration mode following a configuration request received using a first wireless communication protocol responsive to successful communication using a second wireless communication protocol. This can improve security, particularly when the second wireless communication protocol requires use of a second device and a short range communication technology. Further security benefits can be obtained by the tyre monitoring device controlling the exchange of configuration information and instructions.

According to other examples herein, operation of a tyre monitoring device is restricted on detection of an abnormal instruction pattern. For example giving protection against malicious flooding attacks. The restriction on operation may apply to components of the tyre monitoring device which draw the most power, restricting the potential for a third party to cause repeated operation and drain a power source of the tyre monitoring device.

Example Tyre Monitoring System

Figure 1:
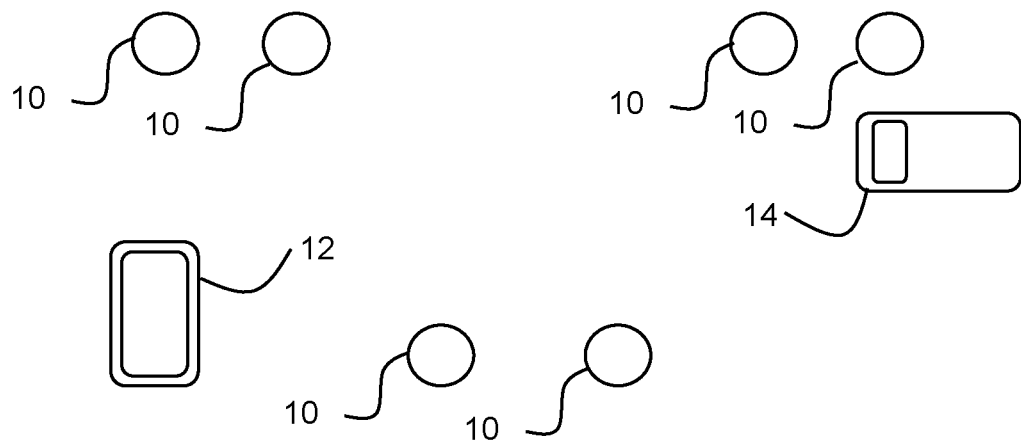
FIG. 1 shows a schematic representation of a tyre pressure sensor system according to a first example of the invention.

FIG. 1 shows a schematic representation of a tyre monitoring system, in this case a pressure sensor system according to a first example. The system comprises a plurality of tyre monitoring devices 10, a control device 12 and a configuration device 14, all of which are arranged to communicate via wireless communication. A tyre monitoring device is mounted on each wheel of a vehicle, in this case an aircraft (as explained in more detail below, with reference to FIG. 5). The control device 12 is separate from the tyre pressure sensors 10 and may be a dedicated control device which functions only in the tyre pressure sensor system, or a computing device which can also be used for other purposes than with the tyre pressure sensor system. Example computing devices include mobile devices such as laptops, tablets, cellular phones and wireless communication devices.

The wireless communications in the tyre pressure sensor system of FIG. 1 may use a local area network or a personal area network and can have any suitable topography, including centralized and mesh wireless systems. In centralized systems, a single device may be nominated as a master device to coordinate communications, or one or more additional wireless access points, gateways or controllers (not shown) may be used. In some examples, the tyre monitoring devices 10, control device 12 and configuration device 14 may all communicate using the same wireless technology and form a single network. In other examples one or more of the tyre monitoring devices 10, control device 12 and configuration device 14 may be separated from other elements of the system. Such separation may be provided in software, for example by providing a suitable firewall and/or the use of different network IDs and encryption keys. Such separation may also be provided by hardware, for example by different wireless communication technology. Both hardware and software separation may be combined. For example, in the system of FIG. 1, the control device communicates with the tyre sensing devices with a different wireless communication technology than the configuration, which may improve the security of the system.

Figure 2:
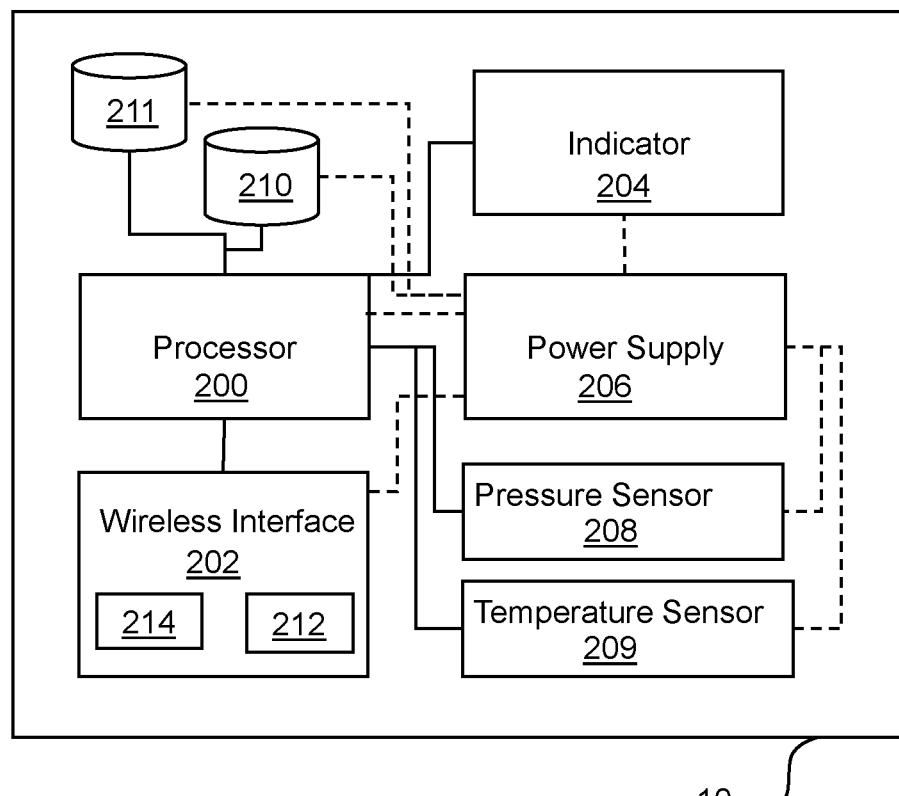
FIG. 2 shows a schematic representation of a tyre monitoring device for use in the example of FIG. 1.

FIG. 2 shows a schematic representation of a tyre monitoring device 10 for use in the tyre pressure sensor system of FIG. 1. The tyre monitoring device 10 is configured for mounting on a wheel, for example by a mechanical connection to an opening on the wheel providing access to the tyre. The tyre monitoring device 10 includes a processor 200, a wireless communication interface 202, an indicator 204, a power supply 206, and a pressure sensor 208, at temperature sensor 209, a first storage 210 and a second storage 211.

Processor 200 may be any suitable processing device including a microprocessor with one or more processing cores. In use, processor 200 coordinates and controls the other components and may be operative to read and/or write computer program instructions and data from/to the storage 210, 211. The processor may be optimized for low power operation or have at least one processing core optimized for low power operation in some examples.

Wireless communication interface 202 is connected to the processor 200 and is used to both transmit and received data from the other devices of the tyre pressure sensor system. In this example, the wireless communication interface includes two transceivers, 212, 214 which both use different wireless technology. A first transceiver 212 is provided for relatively long-range communication, up to about 50 m or about 100 m. For example, the first transceiver may use a communication standard suitable for mobile devices, such as IEEE 802.15.1, IEEE 802.15.4, IEEE 802.11 (Wi-Fi) on either the 2.4 GHz or 5 GHz Industrial Scientific and Medical (ISM) bands or a Wireless Avionics Intra-Communications (WAIC) standard. The first transceiver also includes an encryption module for encrypting sent data and decrypting received data, for example according to the Advanced Encryption Standard (AES) utilizing pre-shared keys. A second transceiver 214 is provided for relatively short-range communications. For example, the second transceiver 214 may use a standard according to IEEE 802.15, such as IEEE 802.15.4, RFID or Near Field Communication (NFC). The second transceiver may operate over a range of less than 5 m, less than 3 m, less than 1 m, less than 50 cm, less than 25 cm, less than 10 cm, less than 5 cm, less than 1 cm or requiring contact between devices. Like the first transceiver 212, the second transceiver 214 also includes an encryption module for encrypting sent data and decrypting received data.

In some examples, a single wireless transceiver may be provided in the wireless communication interface. In that case the single transceiver may use relatively short range or relatively long range communication, or adjust the range (such as by controlling transmit power) as required.

Indicator 204 is connected to the processor 200 and controlled by the processor 200 to provide indications to a user of the tyre pressure sensor system. In this example the indicator is an LED, but in other examples the indicator is another form of light, a display, such as an LCD or e-ink display, or any other form of visual indication. In other examples, the indicator is an audible indicator, such as a buzzer, beeper, speaker or any other sound generating component. In further examples, the indicator can comprise both audible and visual indication components. The indicator provides at least first and second indications, for example a first colour and a second colour of emitted light. Further indications can also be provided, such as solid or flashing light. The tyre monitoring device has a housing (not shown) and the indicator 204 can provide an indication outside the housing, for example the LED may be mounted external to the housing or visible through the housing, or sound may be able to be emitted from within the housing.

The power supply 206 provides power to the elements of the sensing device. It may be a battery, such as Lithium battery. In this example, the power supply is a Lithium battery with power sufficient to run the sensor in normal operation for about 2 to 3 years. In other examples the power supply may comprise a power harvesting system, for example harvesting vibration and/or electromagnetic radiation to charge a capacitor or battery which is then used to power the device.

In use, the wireless sensing device may spend much of its operational life in "sleep" or low power mode, with most of the components other than the processor and wireless communication interface powered off. This can conserve battery life. For example, the tyre monitoring device may be by default in a low power mode, listening for a command to measure or report tyre pressure. As tyre pressure readings are likely to be required relatively rarely, perhaps as little as once every 10 days, once every 5 days, once every 3 days or once per day, this can provide useful power savings. In other examples, pressure may be sensed more frequently for example every 10 minutes, 15 minutes, 20 minutes, 30 minutes, 1 hour or 2 hours and stored for use in trend monitoring.

The pressure sensor 208 is connected to processor 200 and may be any suitable sensor for measuring pressure, for example a capacitive sensor. Similarly, the temperature sensor 209 is connected to processor 200 and may be any suitable sensor for measuring temperature, such as thermocouple. The temperature sensor 209 may be arranged to measure the temperature of the wheel or the temperature of the gas inside the tyre directly. Where the temperature sensor 209 measures the temperature of the wheel, this can be processed to determine the temperature of the gas in the tyre. For example, an algorithm or look-up table may be used.

The connection of the pressure sensor 208 and temperature sensor 209 to the processor 200 may be digital, providing a digital representation of the measured pressure and/or temperature from an Analogue to Digital Convertor (ADC) in the sensor itself, or analogue, in which case the processor may include an ADC to sample the received signal. Including both a pressure sensor and a temperature may be useful to determine a temperature compensated pressure value. Although this example includes a pressure sensor and a temperature sensor, other examples may include only a pressure sensor, or may include further sensors.

This example includes two storage elements 210 and 211. Storage 210 is non-volatile rewritable storage in this example, such as flash memory which can retain data without requiring applied power. Other examples may include volatile storage, which is kept powered by the power supply, or combinations of read-only and rewritable storage. Storage 210 is connected to the processor 200 and used to store both computer program instructions for execution by the processor and data, such as data from the pressure sensor 208 or received over the wireless communication interface 202. In some examples, storage 210 may store a history of pressure and/or temperature readings sensed by the pressure sensor 208 and the temperature sensor 209. For example, the previous ten days readings may be stored, with the newest data replacing the oldest once the storage is full.

Storage 211 is secure storage to which write and/or read access is restricted, for example only accessible to certain processes running on processor 200. Configuration data, such as wireless encryption keys can be stored in storage 211. In other examples, a single storage may be provided, or storage 210 and 211 may be provided in a single physical device with a logical partitioning between storage 210 and storage 211.

Figure 3:
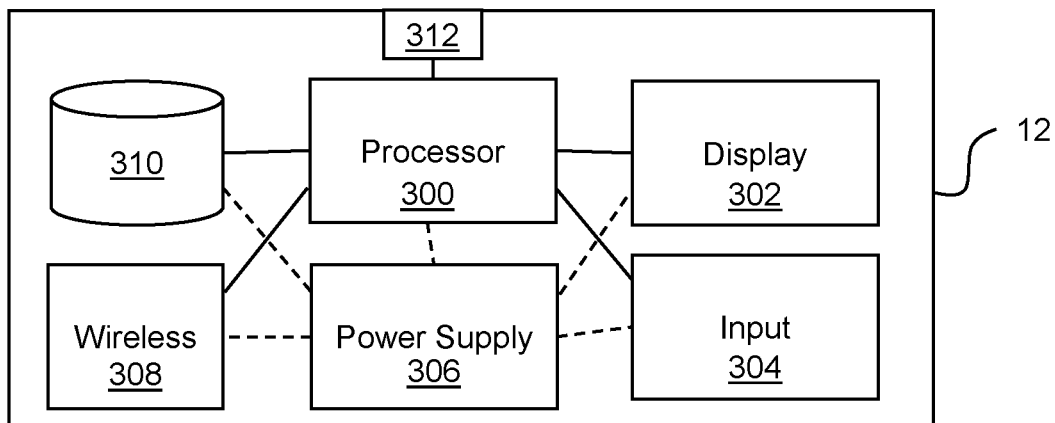
FIG. 3 shows a schematic representation of a control device for use in the example of FIG. 1.

FIG. 3 shows a schematic representation of a control device 12 for use in the example of FIG. 1. The control device 12 includes a processor 300, a display 302, an input system 304, a power supply 306, a wireless interface 308, a storage 310 and wired communication interface 312. In this example the control device is a mobile device, such as a cellular phone or a tablet computer.

The processor 300 is any suitable processing device, for example a multipurpose microprocessor, system-on-chip, or system in package, which may include one or more processing cores. Processor 300 is connected to the display 302, such an LCD, OLED or e-ink display to display information to a user of the control device.

Input system 304 includes a touch screen interface in this example, allowing a user to interact with the control device by touching user interface elements on the screen. The input system 304 may include one or more buttons in addition to the touch screen, as well as other input devices, such as a microphone for speech recognition and a camera for image input. Other examples may not include a touch screen interface.

The control device is powered by power supply 306, which is a rechargeable lithium-ion battery in this example. Other examples may use alternative power supplies, such as other battery technologies, mains power, or energy harvesting, such as solar power.

A wireless interface 308 is included for the control device 12 to communicate with other devices in the tyre pressure sensor system. In this example, a single wireless interface 308 is provided which is configured to communicate with the tyre monitoring devices 10. For example, a relatively long range wireless communication technology can be used, such as one conforming to IEEE 802.15.1, IEEE 802.15.4 or IEEE 802.11. This allows the control device 12 to interact with the tyre monitoring devices from a relatively long range.

In other examples, the control device may be provided with multiple wireless communication interfaces or transceivers, operating with different wireless technologies, such as at least two of IEEE 802.15.1, IEEE 802.15.4, IEEE 802.11 (Wi-Fi_33), WAIC, RFID and NFC. For example, the control device may have two transceivers with one having a longer communication range than the other.

Storage 310 includes a non-volatile element, such as flash memory, and a volatile element, such as RAM. The non-volatile element is used to store operating system software and application software. In this example, the control device runs standard operating system software and is loaded with application software to interact with the tyre pressure sensor system. In order to restrict access to the tyre pressure sensor network, the application software may be provided from a secure source and not available to the general public, and/or require credentials to be entered before operating.

Wired communication interface 312 is provided for connection to a computing system. The wired communication interface 312 can be for example, a serial data connection, such as Universal Serial Bus (USB), a parallel data connection or a network connection, such as Ethernet. The wired communication interface 312 may allow the control device to communicate values and/or other status information read from the tyre monitoring devices to the computing system, for example to store long term trends and assist fleet management. Alternatively, or additionally, wireless communication interface 308 may be used for communication with the computing system. In some examples, the control device may not include a wired communication interface.

Figure 4:
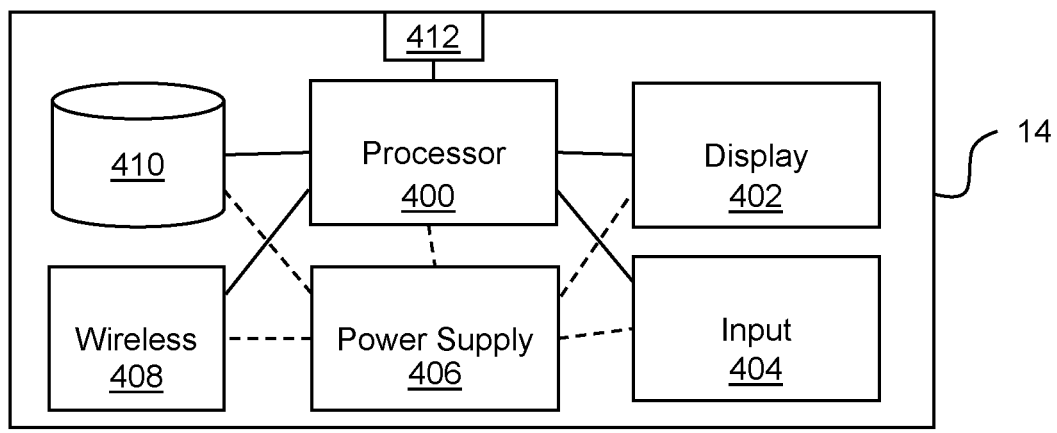
FIG. 4 shows a schematic representation of a configuration device for use in the example of FIG. 1.

FIG. 4 shows a schematic representation of a configuration device 14 for use in the example of FIG. 1. The configuration device 14 includes generally the same elements as the control device 12: a processor 400, display 402, input system 404, power supply 406, wireless interface 408, storage 410 and wired communication interface 412 and these are generally the same as described above for the control device, unless described otherwise below. In this example the configuration device is a mobile device but is restricted to operate only with the tyre monitoring system. For example, the configuration device may be a computing device or tablet which can only run software for interaction with the tyre monitoring system.

The wireless communication interface 408 of the configuration device in this example is a relatively short-range communication system, for example IEEE 802.15.1, IEEE 802.15.4, NFC or RFID. This allows the configuration device to act as an additional authentication factor when configuring the tyre monitoring devices, for example the tyre monitoring device may only respond to configuration commands received from the configuration device or may only respond to configuration commands received from the control device after a command received from the configuration device.

In other examples, the configuration device may include multiple wireless communication interfaces or transceivers. For example, the configuration device may include a transceiver for relatively short range communications as discussed above and a transceiver for relatively long-range communications, such as one conforming to IEEE 802.11.

The wired communication interface 412 of the configuration device may be used to provide information to the configuration device in a secure manner, for example enabling some encryption keys to be updated over a wired interface, such as a serial data connection, rather than a wireless interface.

In some examples, the configuration device 14 may be omitted and its place taken by the control device 12. The control device 12 may comprise a short range wireless communication interface, such as one conforming to IEEE, 802.15.1, IEEE 802.15.4, RFID or NFC. Application software may be loaded onto the control device to allow the control device to also function as an additional authentication factor, perhaps through the maintenance of cryptographic keys which can only be accessed with suitable credentials to control the operation of the short range wireless communication interface for the transmission of configuration commands. In these examples, separate application software may be provided on the control device which can be executed to cause the control device to function as a configuration device.

Figure 5:
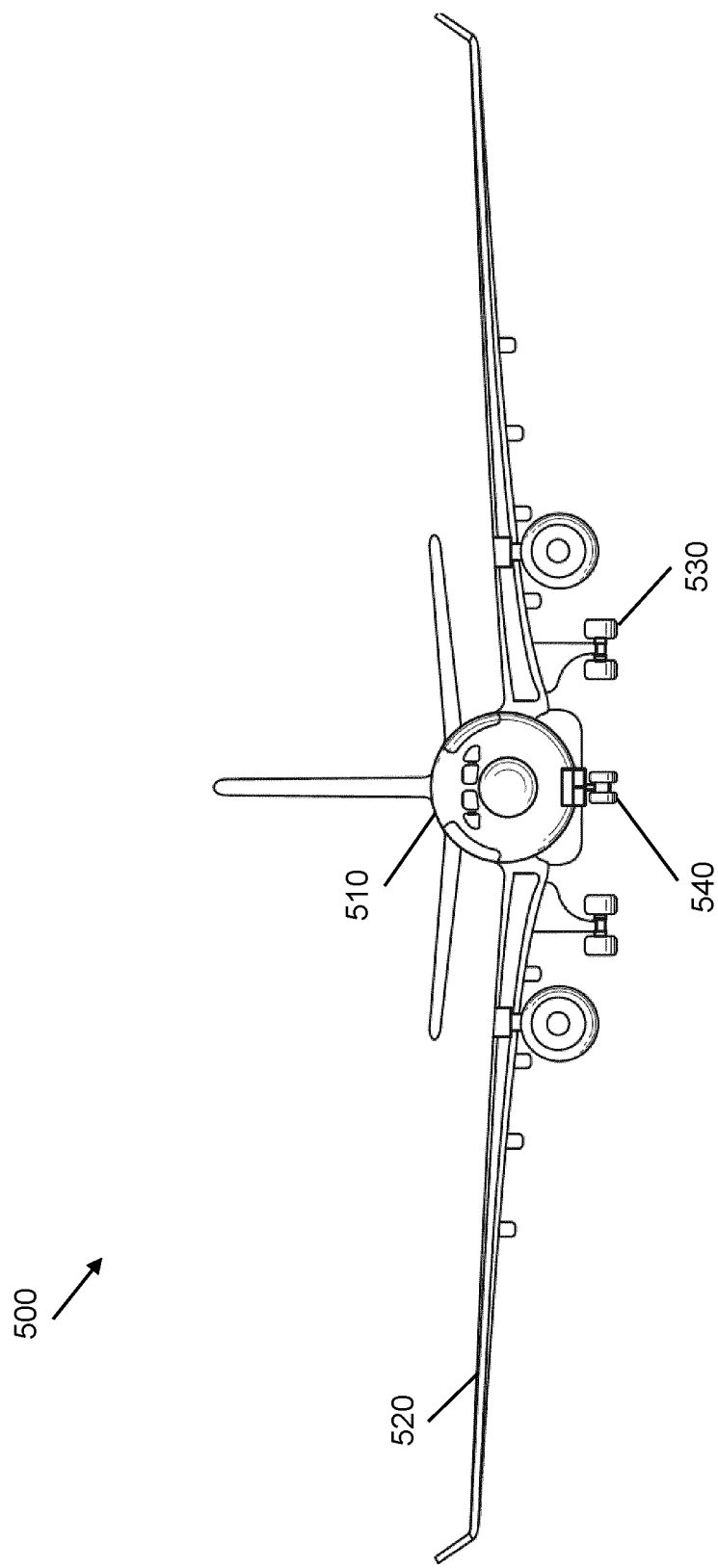
FIG. 5 shows a schematic representation of a tyre pressure sensor network installed in an aircraft.

FIG. 5 shows a schematic representation of a tyre pressure sensor network installed in an aircraft. The aircraft 500 comprises a fuselage 510, wings 520, main landing gear 530 and nose landing gear 540. According to an example, the aircraft 500 comprises a sensor network according to any of the examples described herein. The aircraft 500 may be used in conjunction with any of the methods described herein. According to an example, a plurality of wireless nodes are distributed at various locations around the aircraft 500. For example, in the landing gear 530, 540, the wings 520, and in the fuselage 510. Tyre monitoring devices are installed on each wheel of the main landing gear 530 and nose landing gear 540.

In an example, the tyre monitoring devices 10 are also in communication with a cockpit system to provide tyre pressure information to the pilots on the flight deck. In these examples, the flight deck console may also function as a control device.

Example Tyre Pressure Check Processes

Figure 6:
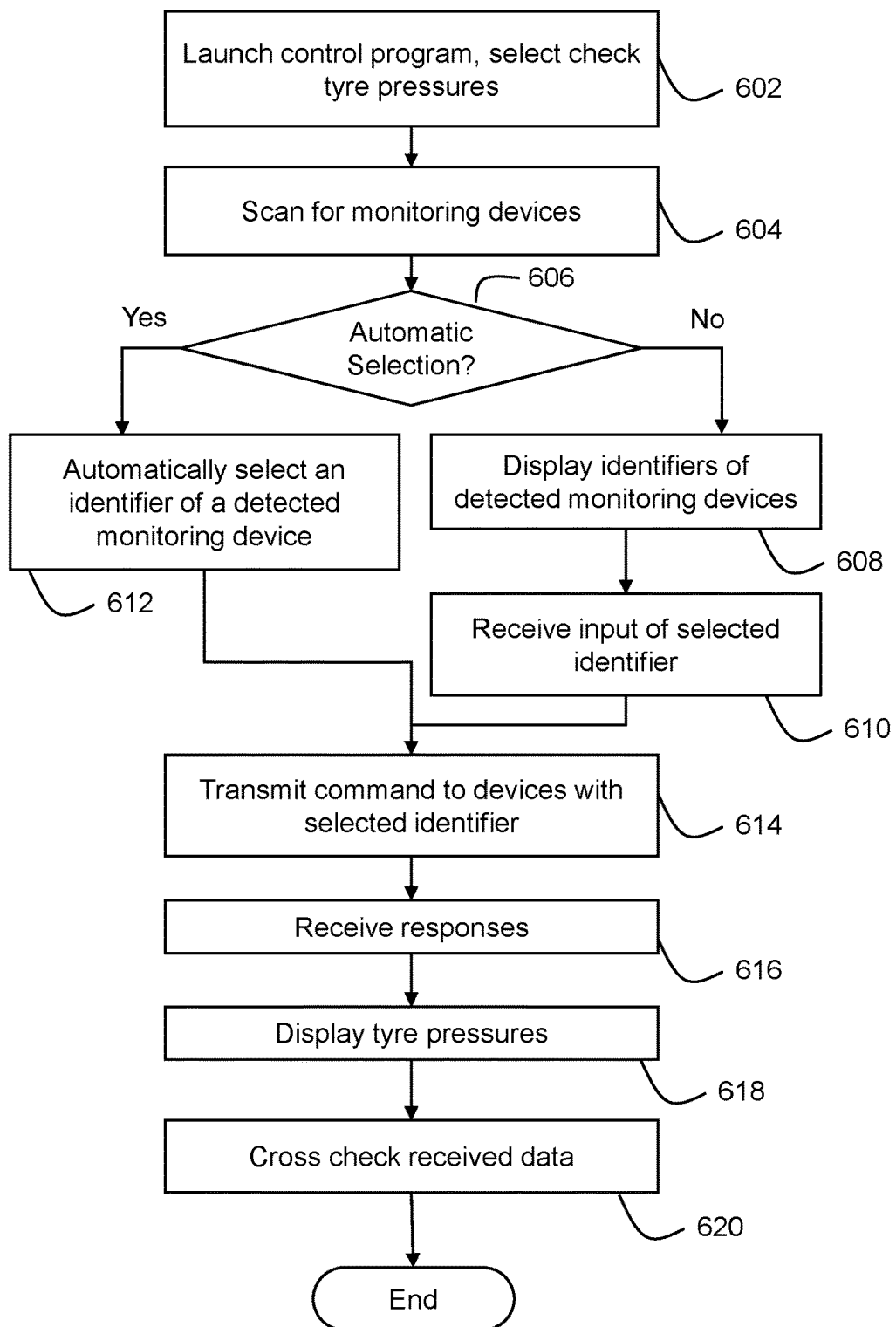
FIG. 6 shows a flow chart of a tyre pressure check process that can be used with the example of FIG. 1.

FIG. 6 shows a flow chart of a tyre pressure check process that can be used with the example of FIG. 1. First, at block 602, a user launches the tyre monitoring control application on the control device 12. During initialization of the application, a check is made that the wireless communication interface 308 for communication with the monitoring devices is active on the control device and the user is prompted to activate if it is not active.

Next, at block 604, the control device scans for tyre monitoring devices in range. For example, the control device may send out a probe over the wireless communication interface which causes any tyre monitoring devices in range to respond with an indication of their vehicle identifier, such as tail identifier of an aircraft to which the tyre monitoring device is attached. The scanning may comprise establishing direct, point-to-point contact with each tyre monitoring device, or contact through the network of tyre monitoring devices, for example through an access point, a master device, or any device in a mesh network. The scanning may comprise waking the tyre monitoring devices from a low power mode. The scanning may comprise using a secure network key to communicate with the sensor network.

Depending on the communication range and location, tyre monitoring devices associated with more than one vehicle may be detected. For example, several aircraft may be in the same hanger in range of the control device. Next, at block 606, it is determined whether an identifier should be selected automatically, without requiring using input. For example, the application may store a configuration option whether an identifier should be selected automatically or not. If automatic selection is not required, the process continues to block 608. If automatic selection is required, the process continues to block 612. In some examples, block 606 is not included. In these examples, the process can continue with either manual selection or automatic selection as explained below.

For manual selection, at block 608, the control device displays the identifiers of detected vehicles. At block 610, input is received of a selected identifier, for example from a user selection of the desired identifier.

For automatic selection, at block 612 a vehicle identifier is automatically selected from amongst the identifiers indicated in the received responses. The can be done in various ways. For example, when each tyre monitoring device in range responds individually to the control device, at least two responses may be from tyre monitoring devices associated with the same vehicle identifier. In that case, the vehicle identifier associated with the largest number of responses may selected automatically because that is likely to be the vehicle closest to the control device for which pressure measurement is required. In another example, the vehicle identifier of the tyre monitoring device closest to the control device may be selected, for example a response having a greatest Received Signal Strength Indication (RSSI). In a further example, all detected tyre monitoring devices may be associated with the same vehicle identifier, in which case that is selected.

Next, at block 614, a command is sent to the tyre monitoring devices corresponding to the selected identifier to cause them to read the pressures and report back to the control device, for example they may execute a process as described below with reference to FIG. 7.

Responses are received from the tyre monitoring devices at block 616 and displayed on the control device at block 618. The display of pressures may include one or both of a numerical value and a status indication such as "OK" or "Low Pressure".

At block 620 a cross check of the received data may be made to ensure data consistency. The process then ends.

Throughout the process of FIG. 6, communication between the control device and the sensor devices may be secure, for example encrypted by a network key. The network key for the communication with the control device may be different from the network key used for communication between the sensor devices to enhance the security of the system.

Security may be increased by using a wireless communication technology with a limited transmission distance when exchanging secure keys, for example 802.11 (Wi-Fi) standards may allow transmission over a distance of 50 m or further in clear space. This alone may be sufficient to provide increased security because physical proximity is required to intercept communications. In some examples, security may be increased by reducing transmission power when encryption keys are transmitted compared to transmission of the encrypted data itself, requiring closer proximity for the initial key exchange process.

Figure 7:
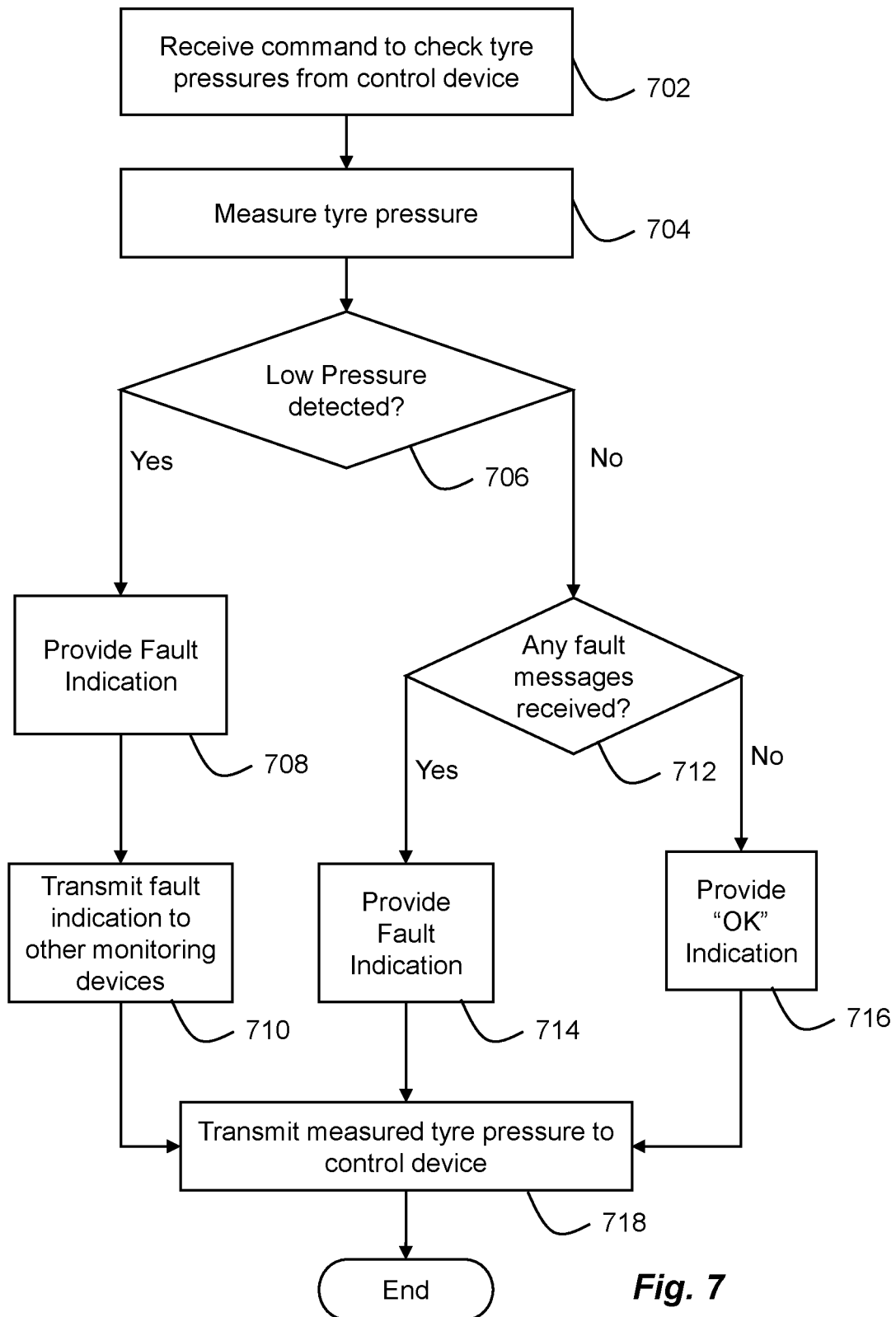
FIG. 7 shows a flow chart of tyre pressure check process that can be used by the tyre monitoring device of FIG. 2.

FIG. 7 shows a flow chart of tyre pressure check process that can be used by the tyre monitoring device of FIG. 2. This process is provided to provide additional assurance and fault tolerance in the pressure measurements from the system, for example to guard against corrupt operation or errors in the control device. Through this process, the monitoring device uses its indicator to provide an indication of tyre pressure status independent of the control device. In some examples, the indication of tyre pressure status by the monitoring device may have a higher Development Assurance Level (DAL) than the indication provided on the control device. For example, although the control device may be used to initiate a tyre pressure measurement and provide a convenient means for a user to understand the results of the measurement it may not have DAL certification, while the operation of the monitoring device to provide the indication using the indicator on the monitoring device may be certified to Development Assurance Level B. This may allow the system to operate with a wide range of control devices, because certification of those devices to a DAL is not required, but still ensure that the system as a whole meets required safety standards. Similarly, in some examples the monitoring device may have a higher Security Assurance Level (SAL) than the control device.

First, at block 702, a tyre monitoring device receives a command to check pressures over the wireless communication interface from the control device. In response, at block 704, the processor uses the pressure sensor to measure the pressure in the tyre. The measured pressure is then compared against the reference pressure in block 706 to determine whether the tyre has low pressure. In this example low pressure occurs if the pressure sensed by the pressure sensor is less than 89% of the reference pressure. Other examples may determine a low pressure when the measured pressure is less than 95%, less than 90% or less than 85% of the reference pressure. Further examples may determine a low pressure when the measured pressure is at least about 207 kPa (about 30 psi) less than the reference pressure. Other examples may determine a low pressure when the measured pressure is at least about 138 kPa (about 20 psi), or about 69 kPa (about 10 psi) less than the reference pressure. If low pressure is detected, execution proceeds to block 708, otherwise execution proceeds to block 712.

At block 708, the processor uses the indicator to indicate a fault condition, for example by providing a solid red light for a predetermined period. The predetermined period may be 5 minutes, 2 minutes, 1 minute, or 30 seconds, for example. The processor also broadcasts a fault indication to the other tyre monitoring devices at block 712, again using the wireless communication interface.

At block 712, the processor checks to see whether any fault messages from other tyre monitoring devices have been received via the wireless communication interface. Such fault messages may be received directly, via other tyre monitoring devices or through a hub or access point. In this example, such fault messages are received without first being requested, following the receipt of the command in block 704. In other examples, the fault message may be received responsive to a status enquiry sent by the tyre monitoring device to the other tyre monitoring devices. If any fault messages are received, execution proceeds to block 714, where the processor uses the indicator to display a fault condition. For example, the fault indication may be the same as that used in block 708. In other examples, the fault indication may be different than that used in block 708, for example a second fault indication such as a flashing red light for a predetermined period. By using the second fault indication, the tyre monitoring device can indicate a fault in another tyre yet signal that its own measured pressure is not low.

If no fault messages are received at block 712, execution proceeds to block 716 where the processor uses the indicator to provide an "OK" indication. For example, by providing a solid green light for a predetermined period. The predetermined period may be 5 minutes, 2 minutes, 1 minute, or 30 seconds, for example. In this way, the "OK" indication is only given when all tyre monitoring devices have determined that the pressure of their associated tyre is not low and that they have not received an indication of a fault from another of the tyre monitoring devices.

Finally, at block 718, the data of the measured tyre pressure is transmitted to the control device in response to the command. This data may include further information such as stored reference pressure, determined status, and wheel position. Transmission of additional information may allow verification of the correct operation of the tyre monitoring device and a check that the configuration data stored in the storage has not changed or has been set up correctly. The transmission in block 718 may be sent directly to a control device 12, to another tyre monitoring device 10 for onward routing, or to an access point or other wireless node.

With the method of FIG. 7, confirmation of tyre pressure status is provided by the tyre monitoring devices themselves. A fault in any sensor causes all sensors to indicate a fault. In this way, the tyre monitoring devices may be certified according to a required DAL and/or SAL using the indication on the tyre monitoring devices themselves without requiring the control device to also be certified.

In other examples, rather than transmitting a fault indication at block 710, all tyre monitoring devices may instead transmit their measured pressure to other tyre monitoring devices. Received pressures may then be independently checked by each independent tyre monitoring device to determine whether faults exist. This may guard against a fault in a sensor which does not indicate a low pressure condition, for example if the stored reference pressure has become corrupted.

In further examples, the tyre monitoring device may transmit an "OK" status notification when it is determined that the tyre pressure is not low in block 706. Such examples may provide assurance that all sensors are operating correctly, because if no data is received from one of the other tyre monitoring devices it is indicative of a malfunction or fault in that tyre monitoring device.

Although the processes above describe the use of a general mobile device as a control device, the control device may also be a dedicated device provided only for use with the tyre monitoring system, or with the vehicle more generally. This may improve security as greater control is available.

Although the processes above describe the use of an indicator which is a light, other examples may use other indicators, such as displays and/or audio components. For example, rather than simply display a solid or flashing colour, a display may also display information of the measured pressure itself. Where audio and visual indicators are both provided, some indications may not use both the audio and visual indicator. For example, an "OK" indication may use only the visual indicator, with the audio indicator only activated on a fault.

Configuration Mode Entry for a Tyre Monitoring Device

In one example, a tyre monitoring device, such as the device described above in relation to FIG. 2 may need to be configured prior to, or after, installation on wheel of a vehicle, such as the aircraft of FIG. 5. Configuration of the tyre monitoring device occurs in a configuration mode, which may also be referred to as an administration mode, programming mode, or maintenance mode, during which a plurality of different instructions or commands may be received by the tyre monitoring device. The instructions cause specific configuration or maintenance actions to be undertaken as will be described below. When not in the configuration mode, the tyre monitoring device may operate as described above in relation to FIG. 2, obtaining pressure readings from tyres associated with wheels of a vehicle, and transmitting them to other devices forming part of a system. Enabling configuration instructions to be executed only when in the configuration mode increases security and reduces the risk of a configuration being inadvertently or maliciously changed.

Figure 8:
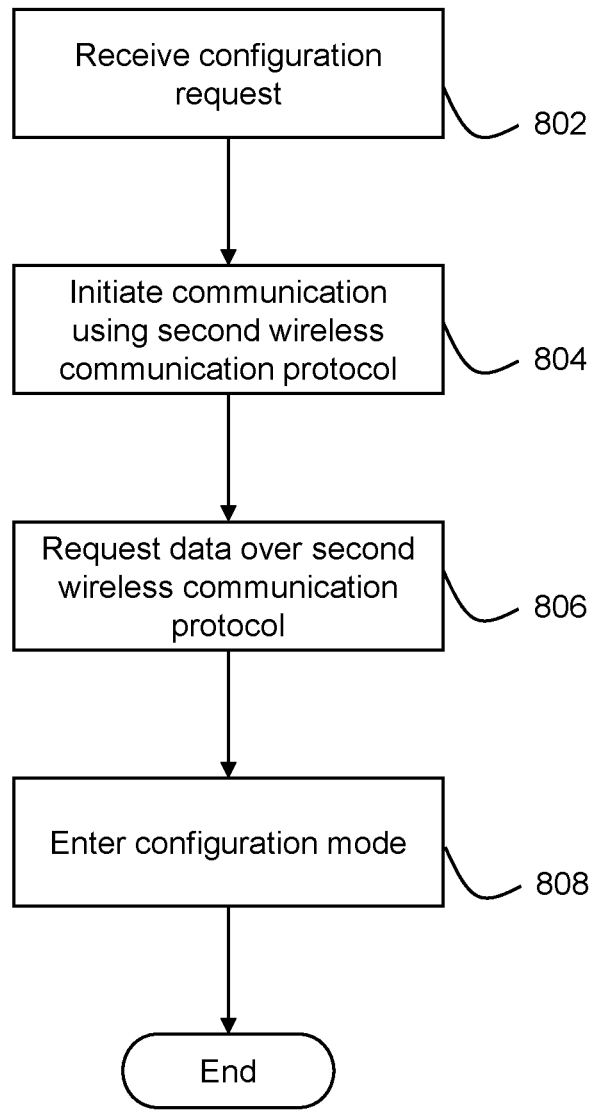
FIG. 8 shows a flow-chart of a process for entering a configuration mode that can be used by the tyre monitoring device of FIG. 2.

FIG. 8 shows a flow-chart of a process for entering a configuration mode that can be used by the tyre monitoring device of FIG. 2. The process of FIG. 8 may be used prior to the fitting of the tyre monitoring device to a vehicle, or alternatively after the tyre monitoring device has been fitted to the wheel of a vehicle, such as the aircraft of FIG. 5. Furthermore, the process may be used when the tyre monitoring device has not previously been configured, or may be used to adjust at least one configuration setting of the tyre monitoring device which was set previously. For example, the process may be used when the tyre monitoring device has been first installed on a wheel of an aircraft to set initial parameters and other settings such as reference pressures, location on the aircraft, as well as allocate the tyre monitoring device to a particular aircraft, such as by setting a vehicle identifier.

First, at block 802, the tyre monitoring device receives a configuration request from a second device. The second device may be a control device, and/or a configuration device as described above in relation to FIG. 3 and FIG. 4. As mentioned above, and with reference to the tyre monitoring device of FIG. 2, the wireless communication interface of the tyre monitoring device may comprise two transceivers, which both use different wireless communication technology. The two transceivers may be arranged to communicate using wireless communication protocols having different ranges. For example, the first wireless communication protocol is arranged to communicate using a longer-range wireless communication protocol, such as one with a range of at least 20 m, whereas the second wireless communication interface is arranged to communicate using a relatively short-range wireless communication protocol, such as NFC or RFID having a range of 10 cm or less. It will be appreciated that other wireless communication protocols may be used.

The configuration request is sent from the second device to the tyre monitoring device using the first wireless communication protocol. In one example, the configuration request need not be a configuration instruction per se, but may in fact be a signal and/or other indication provided to the tyre monitoring device of the desire to enter the configuration mode. In other examples the configuration request may also comprise a configuration, maintenance, programming or administration instruction such as a tyre monitoring device test instruction, a system test instruction, a fault reset instruction, or a delete instruction.

Next at block 804, the tyre monitoring device initiates communication using the second wireless communication protocol. Communication using the second wireless communication protocol is initiated upon receipt of the configuration request, and comprises determining whether a device is within the range of tyre monitoring device and capable of communicating over the second wireless communication protocol. As the second wireless communication protocol has a relatively short range in comparison to the first wireless communication protocol over which the configuration request is received, this means that configuration requests may be sent from some distance away from the tyre monitoring device. However, the tyre monitoring device only enters the configuration mode and executes configuration instructions if there is also a device within the short range of the second wireless communication protocol. This prevents the malicious and/or accidental execution of configuration/maintenance instructions. For example, it is possible that several devices will receive the configuration request and the short range of the second communication protocol can identify the intended device for the configuration request, with the others taking no action.

In some examples the communication using the second wireless communication protocol requires using a separate device from the one sending the configuration request, such as the configuration device discussed above with reference to FIG. 4. In other examples, the communication using the second wireless communication protocol may use the same device that sent the configuration request, possibly requiring moving the device closer to the tyre monitoring device and/or running a further program to cause it to function as a configuration device.

In some examples it may be desirable to determine whether the device communicating with the tyre monitoring device using the second wireless communication protocol is trusted, authenticated or genuine. This may be achieved by encrypting the communications sent using the second wireless communication protocol so that only communications from trusted devices can be decrypted, by checking an identifier of a device communication with the tyre monitoring device using the second wireless communication protocol against a database of known trusted devices, and/or by applying a digital signature to communications using the second wireless communication protocol. When it is determined that the device communicating with tyre monitoring device using the second wireless communication protocol is not a trusted device, an automated response may be performed which does not alter the configuration, such as indicating that the device is not trusted, or performing a local pressure check and one or both of transmitting the results and storing the results.

Next, at block 806, once communication over the second wireless communication protocol has been initiated, it is determined whether communication is successful. For example the tyre monitoring device may request data over the second wireless communication protocol. The data may be an identifier of a device positioned within the range of the second wireless communication protocol, but may also be any other form of data capable of indicating the presence of the device. The identifier or other data may be encrypted such that it is capable of being decrypted by the tyre monitoring device, thereby indicating that the device is authorised to authenticate the configuration request. In one example, the tyre monitoring device may try to establish successful communication over the second wireless communication protocol for a predetermined period of time, such as less than 5 seconds, less than 2 seconds, less than 1 second, less than 100 milliseconds, or less than 10 milliseconds. If data is not received within the predetermined time period, then the communication request is rejected, and the tyre monitoring device does not enter the configuration mode.

The shorter-range of the second wireless communication protocol means that the device must be positioned close to the tyre monitoring device, such as within 10 cm, or even directly touching the tyre monitoring device. The short range has security advantages, requiring physical proximity to enter configuration mode. Operational advantages, also arise from the short range, ensuring that only one tyre monitoring device enters the configuration mode when several are within range of the first communication protocol, to reduce the likelihood of configuring the wrong tyre monitoring device.

Once data has been received via the second wireless communication protocol, as one example of established successful communication, the method proceeds to block 808, where the tyre monitoring device enters configuration mode. In the configuration mode, as mentioned above, the tyre monitoring device is arranged to respond to configuration instructions sent via the first wireless communication protocol. Where the configuration request itself is a configuration instruction, the tyre monitoring device may be arranged to respond initially to that instruction and then wait for further configuration instructions to be received.

In some examples, data flow in the configuration mode is controlled by the tyre monitoring device so that configuration data and/or instructions are responsive to requests from the tyre monitoring device. This can improve security because the window for attack is smaller; rather than sitting in the configuration mode awaiting configuration instructions and data, the tyre monitoring device can await instructions for a shorter time window following its own command to begin data transfer.

The tyre monitoring device may stay in the configuration mode for a predetermined timeout period, before returning to the normal operation mode. This ensures that the device automatically exits configuration mode thereby increasing the security of the device and reducing the risk of malicious/unintended instructions being executed. The timeout period may be any suitable period and may be customisable by an administrator of a system. For example, the timeout period may be a period of less than 5 seconds, less than 2 seconds, less than 1 second, less than 100 milliseconds, or less than 10 milliseconds.

Figure 9:
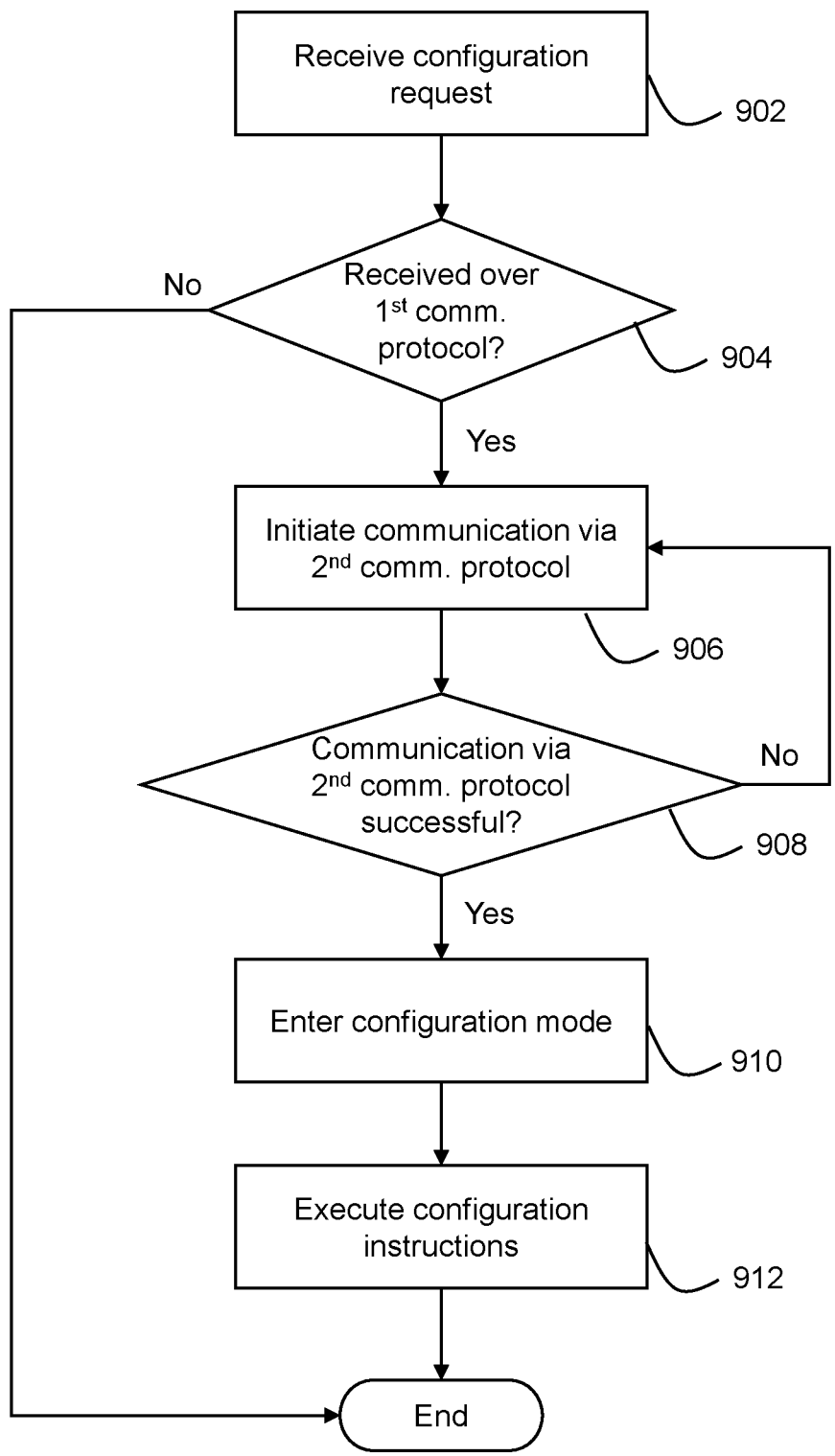
FIG. 9 shows a flow chart of the process of receiving configuration instructions at a tyre monitoring device, such as the tyre monitoring device of FIG. 2.

FIG. 9 shows a flow chart of a process of receiving configuration instructions at a tyre monitoring device, such as the tyre monitoring device of FIG. 2. First, at block 902, a configuration request is received by the tyre monitoring device. As described above in relation to FIG. 8, the request may be an indication that the device is to enter the configuration mode, or alternatively, the request may be an instruction categorised as a configuration, maintenance, administration, programming, or any other suitable instruction requiring the device to be in a configuration mode.

Next, at block 904 it is determined whether the request is received via a first wireless communication protocol. If so, the yes branch is followed to block 906, if not the no branch is followed, the request is ignored, and the process ends. In some examples, further checks may be undertaken to determine whether the request is received from a trusted, authenticated or genuine device. If the request is received via an unauthenticated device, then an automated response may be performed as described above.

At block 906, the tyre monitoring device initiates communication via a second wireless communication protocol, wherein the second wireless communication protocol has a range which is shorter than the range of the first wireless communication protocol over which the configuration request was received.

Next, at block 908, it is determined whether communication via the second wireless communication protocol was successful. Success of the communication, may as described above, be associated with whether data was received via the second wireless communication protocol. In one example, success may be determined based on whether the data received could be decrypted, such as a device identifier being sent in an encrypted format, and is only able to be decrypted if the correct encryption keys associated with the device are known. If it is determined that communication via the second wireless communication protocol was successful, the yes branch is followed to block 910, if communication is unsuccessful, the no branch is followed back to block 906, where the method waits until communication via the second wireless communication protocol is successful. In one example, where communication is unsuccessful, the no branch is followed back to block 906 a predetermined number of times, or for a predetermined time period as described above. Once the time period has expired, or the process has looped the predetermined number of times, a new configuration request must be sent in order to enter the configuration mode, thereby restarting the process.

At block 910, upon successful communication via the second wireless communication protocol, the tyre monitoring device enters the configuration mode. Next, at block 912, configuration instructions are received via the first wireless communication protocol and are executed. In some examples, the configuration request itself may be a configuration instruction and, as such, on entry in to the configuration mode, the instruction which initiated the entry into the configuration mode may be executed. In yet a further example, the tyre monitoring device may be in the configuration mode for a predetermined time, after which the device returns to its normal operation. As such, a user will be requires to submit a new configuration request should they wish to execute configuration instructions.

Restricting the Operation of a Tyre Monitoring Device After Detecting Abnormal Instructions In one example, restricting the operation of a tyre monitoring device, such as the tyre monitoring device described above in relation to FIG. 2, is desirable. The tyre monitoring device comprises a number of components which require power, and in some examples, where the power supply is non-replaceable and/or non-rechargeable, efficient management of the operation of the various components is necessary in order to maximise the lifespan of the device. Furthermore, restricting the operation of at least some of the components of the tyre monitoring device has the benefit of increasing security if the device is requested/instructed to operate outside its usual/expected parameters. The tyre monitoring device may form part of a system also comprising at least one further device arrange to send instructions to the tyre monitoring device.

Figure 10:
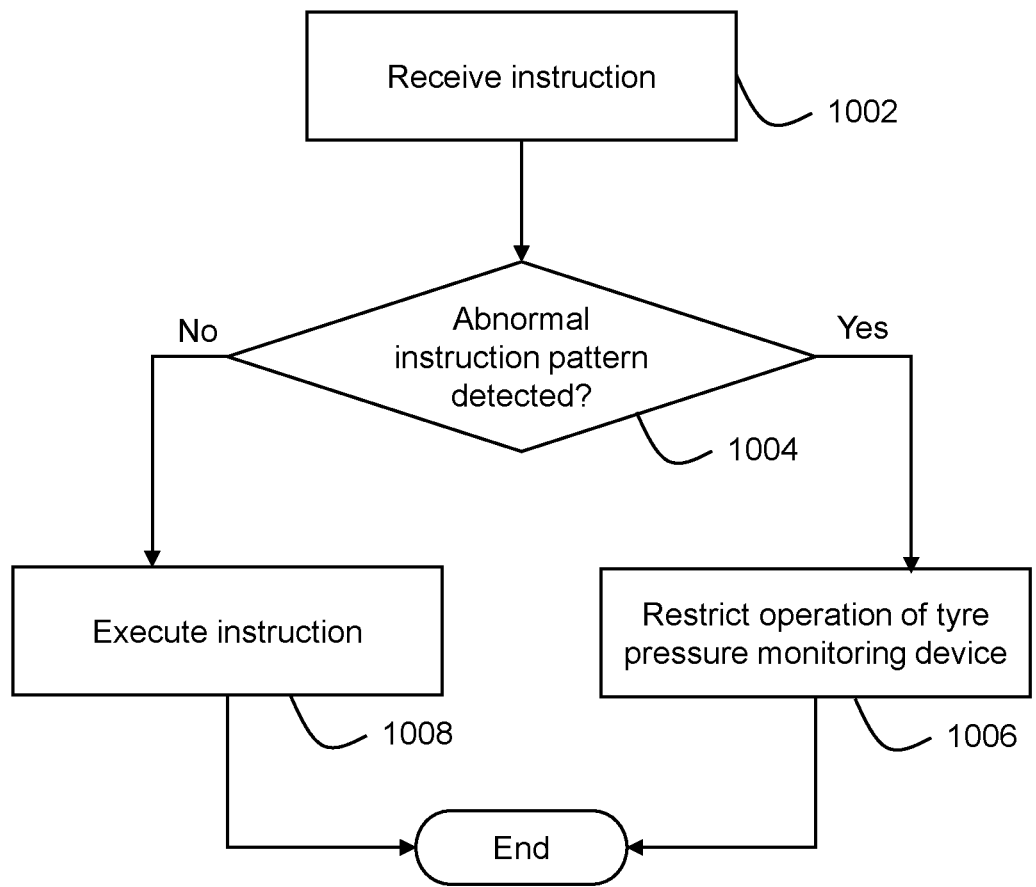
FIG. 10 shows a flow chart of a process for detecting abnormal instruction patterns, that can be used by the tyre monitoring device of FIG. 2.

FIG. 10 shows a flow chart of a process for detecting abnormal instruction patterns, that can be used by the tyre monitoring device of FIG. 2. The tyre monitoring device may form part of a system, such as the system described above in relation to FIG. 1.

First, at block 1002, the tyre monitoring device receives an instruction from a second device. The second device may be any device arranged to communicate with the tyre monitoring device, and may for example, be a control device or configuration device such as those described above in relation to FIGS. 3 and 4. In some examples, the second device may be any other device, such as a third party device, not registered with the system associated with the tyre monitoring device, but capable of communication with it.

Next, at block 1004, it is determined whether an abnormal instruction pattern has been detected. If so, the yes branch is followed to block 1006, if not, then the no branch is followed to block 1008. The detection of an abnormal instruction pattern may be based on a number of factors. The conditions for detecting an abnormal instruction pattern may be user customisable, and in one example may be based on determining whether a predefined number of instructions have been received within a predetermined time period. The time period may be less than 5 minutes; less than 2 minutes; less than 1 minute; less than 30 seconds; or less than 10 seconds. However, it will be appreciated that other time periods may be used as determined by the requirements of the system.

The predefined number of instructions may be based on a type associated with the received instruction. For example, the receipt of a plurality of maintenance/configuration instructions received in a given time period may be smaller than the number of operation instructions, such as 'read pressure' or 'provide indication' instructions, thereby increasing the security of the device by limiting administration/configuration commands being received within the predetermined time period.

In yet another example, detecting an abnormal instruction pattern may comprise receiving a predetermined pattern of instructions based on their type. This predetermined pattern may be based on a sequence of instructions arranged to perform critical/sensitive operations undertaken by the tyre monitoring device, such as the reassignment/deletion of a tyre monitoring device from a system. This sequence of instructions may be based on receiving types of instruction within a particularly short period of time, such as less than 10 seconds. In another example, the sequence of commands may be determined to be abnormal if an additional authentication method is not provided. Such an authentication method may be achieved using the process described above in relation to FIGS. 8 and 9. For example, where a request to enter configuration mode is received by communication over the second wireless communication protocol is repeatedly unsuccessful an abnormal pattern may be determined. An abnormal pattern may occur when the number of unsuccessful configuration mode requests within a time period is greater than the number of wheels on the aircraft, so the unsuccessful attempts cannot necessarily be explained by receiving configuration mode requests intended for other tyre monitoring devices in close range.

In yet a further example, detecting an abnormal instruction pattern may comprise determining the source device of the plurality of received instructions. For example, if the predefined number of instructions are received from more than one device within the predetermined time period, then it may be determined that there is likely to be a malicious attack, and as such it may be determined that this is an abnormal instruction pattern. Restricting the operation of the tyre monitoring device can therefore limit the effects such a distributed attack may have. Conversely, where it is detected that a significantly large number of instructions originate from a single device, where the large number is significantly more than the predefined number of instructions, this may too be determined to be a malicious attack, and as such be indicative of an abnormal instruction pattern.

At block 1006, when an abnormal instruction pattern has been detected, the tyre monitoring device restricts the operation of the tyre monitoring device. The restriction of the operation of the tyre monitoring device may be based on restricting the operation of at least one component of the tyre monitoring device. For example, upon detection of an abnormal instruction pattern, the operation of an indicator and/or pressure sensor may be limited/restricted. As discussed above, limiting the operation of such components, which are relatively power intensive, would result in an increased life span for the device and reduce the risk of a malicious attack being able to prematurely drain the power supply. In other examples, restricting the operation of the tyre monitoring device may comprise rejecting or not responding to instructions received. This limits the effects of large numbers of instructions being executed thereby also increasing the security of the device.

In one example, when an abnormal instruction pattern has been detected, the restriction of the operation of the tyre monitoring device may continue for a predetermined timeout period. Furthermore, whilst operation is restricted, the device may continue to detect abnormal patterns, restarting the timeout period on detection of a new abnormal instruction pattern. The timeout period may be a user determined time, such as less than 30 minutes, less than 20 minutes, less than 10 minutes, less than 5 minutes, or less than 1 minute. This enables the tyre monitoring device to resume normal operation without further user intervention, when the conditions of the abnormal instruction pattern have ceased.

At block 1008, when it is determined that the received instruction does not form part of an abnormal instruction pattern, the tyre monitoring device operates normally, and executes the instruction.

Further examples are defined below with reference to the following features:

Feature 1. A method of restricting the operation of a tyre monitoring device comprising a wireless communication interface, the method comprising, at the tyre monitoring device:

receiving instructions via the wireless communication interface;

detecting an abnormal instruction pattern based on the received instructions; and restricting the operation of at least one component of the tyre monitoring device responsive to detecting the abnormal instruction pattern.

Feature 2. The method of feature 1, wherein the abnormal instruction pattern comprises receiving at least a predetermined number of instructions in a first predetermined period of time.

Feature 3. The method of feature 2, wherein the first predetermined period of time is less than 5 minutes.

Feature 4. The method of feature 2 or 3, wherein at least one of the predetermined number of instructions and the first predetermined period of time is dependent on a type of the instruction.

Feature 5. The method of any previous Feature, comprising restricting the operation of the at least one component of the tyre monitoring device for a second predetermined period of time.

Feature 6. The method of feature 5, wherein the second predetermined period of time is than 30 minutes.

Feature 7. The method of any previous feature, comprising:

determining that received instructions originate from different sources;

wherein the detecting an abnormal instruction pattern is based on the determined that received instruction originate from different sources.

Feature 8. The method of any previous feature, wherein the at least one component comprises at least one of a pressure sensor, a temperature sensor, and an indicator.

Feature 9. A tyre monitoring device comprising:
a wireless communication interface; and
a processor configured to execute the method of any one of features 1 to 8.

Feature 10. A tyre monitoring device configured to be mounted on a wheel of a vehicle and comprising:
a wireless communication interface;
a pressure sensor;
a temperature sensor;
an indicator; and
a processing system configured to:
receive instructions via the wireless communication interface;
detecting an abnormal instruction pattern based on the received instructions; and
responsive to detecting the abnormal instruction pattern restricting the operation of at least one of the pressure sensor, temperature sensor and indicator.

Feature 11. A tyre monitoring system, comprising:
a plurality of tyre monitoring devices according to feature 9 or 10.

Feature 12. A computer-readable medium comprising computer-readable instructions that when executed by a processor of a tyre monitoring device, cause the tyre monitoring device to execute the method of any of features 1 to 8.

It is to be noted that the term "or" as used herein is to be interpreted to mean "and/or", unless expressly stated otherwise.

The above examples are to be understood as illustrative examples of the invention. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A method comprising at a tire monitoring device:
receiving a configuration request from a first device, the configuration request indicating that the tire monitoring device is to operate in a configuration mode, the configuration request provided using a first wireless communication protocol;
responsive to receipt of the configuration request, initiating a communication using a second wireless communication protocol;
establishing successfully the communication using the second wireless protocol;
entering the configuration mode responsive to the establishing successfully the communication using the second wireless communication protocol, and
rejecting a configuration request when received via the second wireless communication protocol.

2. The method of claim 1, wherein, in the configuration mode, the tire monitoring device receives at least one of configuration data and configuration instructions from the first device using the first wireless communication protocol.

3. The method of claim 2, wherein the configuration instructions comprise at least one of: a data download instruction; a tire monitoring device test instruction; a system test instruction; a fault reset instruction; and a delete instruction.

4. The method of claim 2, wherein, in the configuration mode, communication with the first device using the first wireless communication protocol is controlled by the tire monitoring device.

5. The method of claim 1, further comprising determining that the first device is trusted and the entering the configuration mode is responsive both the determination that the first device is trusted and the establishing successful the communication using the second wireless communication protocol.

6. The method of claim 1, wherein the communication using the second wireless protocol is with a second device, different from the first device.

7. The method of claim 1, wherein the tire monitoring device remains in the configuration mode for a predetermined time period after entering the configuration mode.

8. The method of claim 1, wherein the first wireless communication protocol has a larger range than the second wireless communication protocol.

9. The method of claim 1, wherein the first wireless communication protocol has a range of more than 20 m and the second wireless communication protocol has a range of less than 10 centimeters.

10. A tire monitoring device comprising:
a wireless communication interface; and
a processing system configured to cause the tire monitoring device to execute the method of claim 1.

11. A tire monitoring device according to claim 10, wherein the wireless communication interface comprises:
a first transceiver for communication using the first wireless communication protocol; and
a second transceiver for communication using the second wireless communication protocol.

12. A tire monitoring system, comprising:
a tire monitoring device according to claim 10; and;
a first device arranged to send at least a configuration request to the tire monitoring device.

13. A computer-readable medium comprising computer-readable instructions that when executed by a processor, cause a tire monitoring device to execute the method of claim 1.

14. A tire monitoring device configured to be mounted on a wheel of a vehicle, the tire monitoring device comprising:
a first wireless communication interface;
a second wireless communication interface; and
a processing system configured to enter the tire monitoring device into a configuration mode by:
receiving a configuration request using the first wireless communication interface;
responsive to receipt of the configuration request, initiating a communication using the second wireless communication interface;
establishing successfully the communication using the second wireless communication interface;
entering a configuration mode responsive to the establishing successfully the communication using the second wireless communication interface, and
rejecting a configuration request when received via the second wireless communication protocol.

* * * * *